UNITED STATES PATENT OFFICE.

HENRY W. MORROW, OF WILMINGTON, DELAWARE.

MANUFACTURE OF PARCHMENTIZED FIBER.

SPECIFICATION forming part of Letters Patent No. 439,970, dated November 4, 1890.

Application filed April 24, 1890. Serial No. 349,325. (No specimens.)

*To all whom it may concern:*

Be it known that I, HENRY W. MORROW, a citizen of the United States, and a resident of Wilmington, New Castle county, Delaware, have invented certain Improvements in the Manufacture of Parchmentized Fiber, of which the following is a specification.

One object of my invention is to produce laminated forms of parchmentized vegetable fibrous material with which foreign matter, either active or inert, has been combined, a further object being to modify the character of the resultant laminated product by combining with the vegetable fibrous material, before it is subjected to the transforming-bath, foreign matter which will also be acted upon by the transforming-bath.

Heretofore in the manufacture of laminated forms of parchmentized fibrous material by passing the vegetable fibrous material through the chemical transforming-bath in sheet form and subsequently rolling and impacting said sheets, it has been deemed impracticable to combine foreign matter with the paper sheet, it being considered that the presence of foreign material so combined with the sheet would cause the impacted sheets or slab to blister. I have found, however, that by permitting or causing a practical cessation of chemical action before the sheets are impacted I can introduce into or combine with the sheet earthy, mineral, or metallic substances, gums, resins, &c., without risk of causing blistering of the slab after the sheets have been compacted.

In carrying out the invention the roll or cylinder on which the chemically-treated sheet is usually wound should be located so far from the transforming-bath that chemical action shall have practically ceased before the sheet reaches the winding-roller; or the chemically-treated sheet may be cooled by an air-blast or otherwise in its passage from the transforming-bath to the impacting-rollers with substantially the same result.

In carrying out my invention I prefer to combine with the paper in the first instance some substance or mineral which will itself be changed in character by the action of the transforming-bath, and will thus improve or modify the character of the parchmentized product. For instance, by incorporating barium-chloride with the paper and using sulphuric acid as a transforming-bath I obtain in the finished product the insoluble barium-sulphate, the effect of which is to render the material water-proof.

Having thus described my invention, I claim and desire to secure by Letters Patent—

1. The mode herein described of making laminated forms of parchmentized fibrous material having foreign matter combined therewith, said mode consisting in combining said foreign matter with the vegetable fibrous sheets, subjecting the latter to the action of the transforming-bath, and impacting them after the chemical action has practically ceased, substantially as specified.

2. The mode herein described of making laminated forms of parchmentized fibrous material, said mode consisting in combining with the vegetable fibrous material foreign matter susceptible of change in the transforming-bath, then subjecting the fibrous material, together with said foreign matter, to the action of the transforming-bath, and finally superposing and impacting the sheet or sheets, substantially as specified.

3. Laminated forms of parchmentized fibrous material having inert foreign matter permanently combined with the laminæ thereof, substantially as specified.

4. Laminated forms of parchmentized fibrous material having an insoluble mineral salt combined therewith, substantially as specified.

In testimony whereof I have signed my name to this specification in the presence of two subscribing witnesses.

HENRY W. MORROW.

Witnesses:
EUGENE ELTERICH,
HARRY SMITH.